Figure 1:
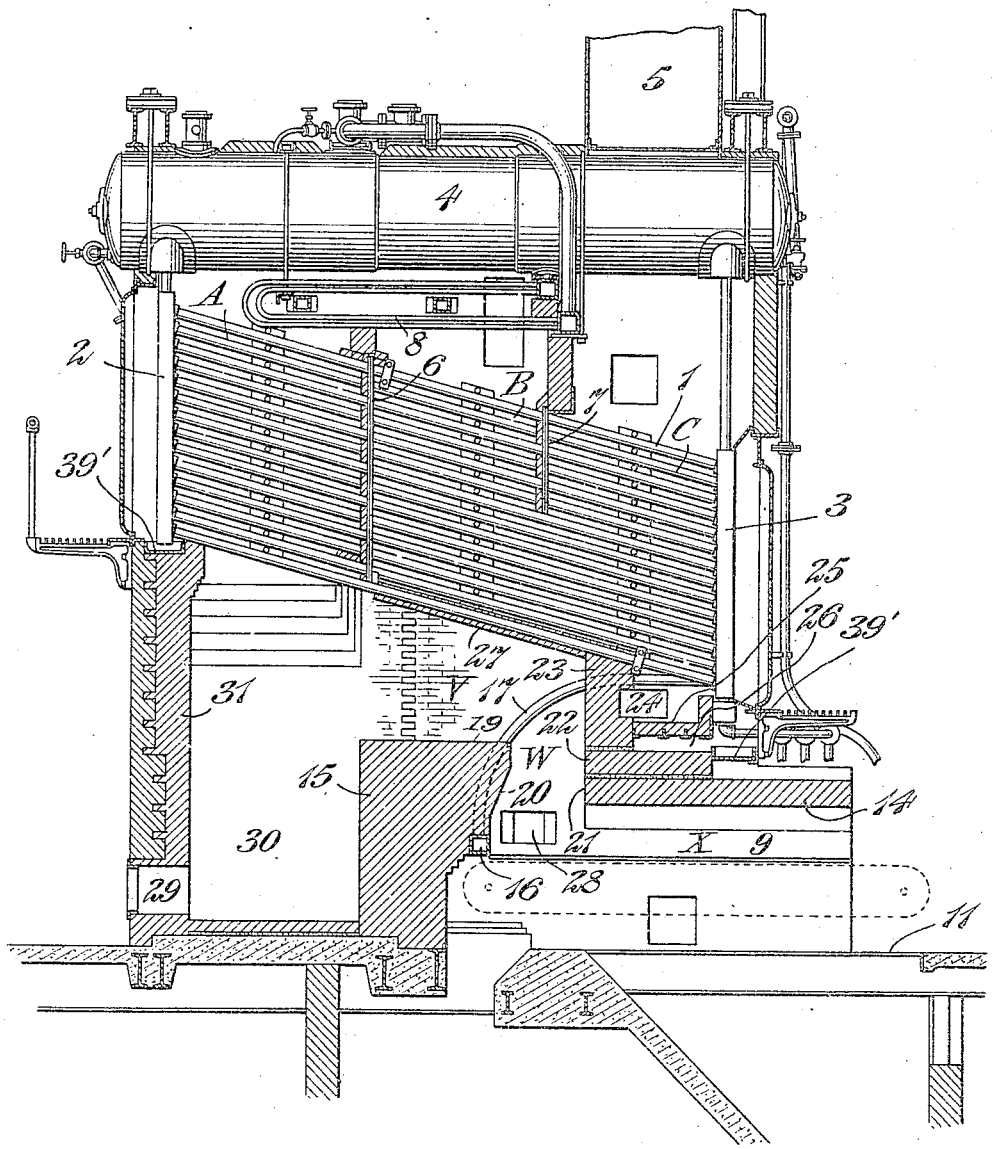

M. W. SEWALL, D. S. JACOBUS & G. E. PALMER.
WATER TUBE BOILER.
APPLICATION FILED FEB. 20, 1909.

1,094,754.

Patented Apr. 28, 1914.
5 SHEETS—SHEET 1.

M. W. SEWALL, D. S. JACOBUS & G. E. PALMER.
WATER TUBE BOILER.
APPLICATION FILED FEB. 20, 1909.
1,094,754.
Patented Apr. 28, 1914.
5 SHEETS—SHEET 2.
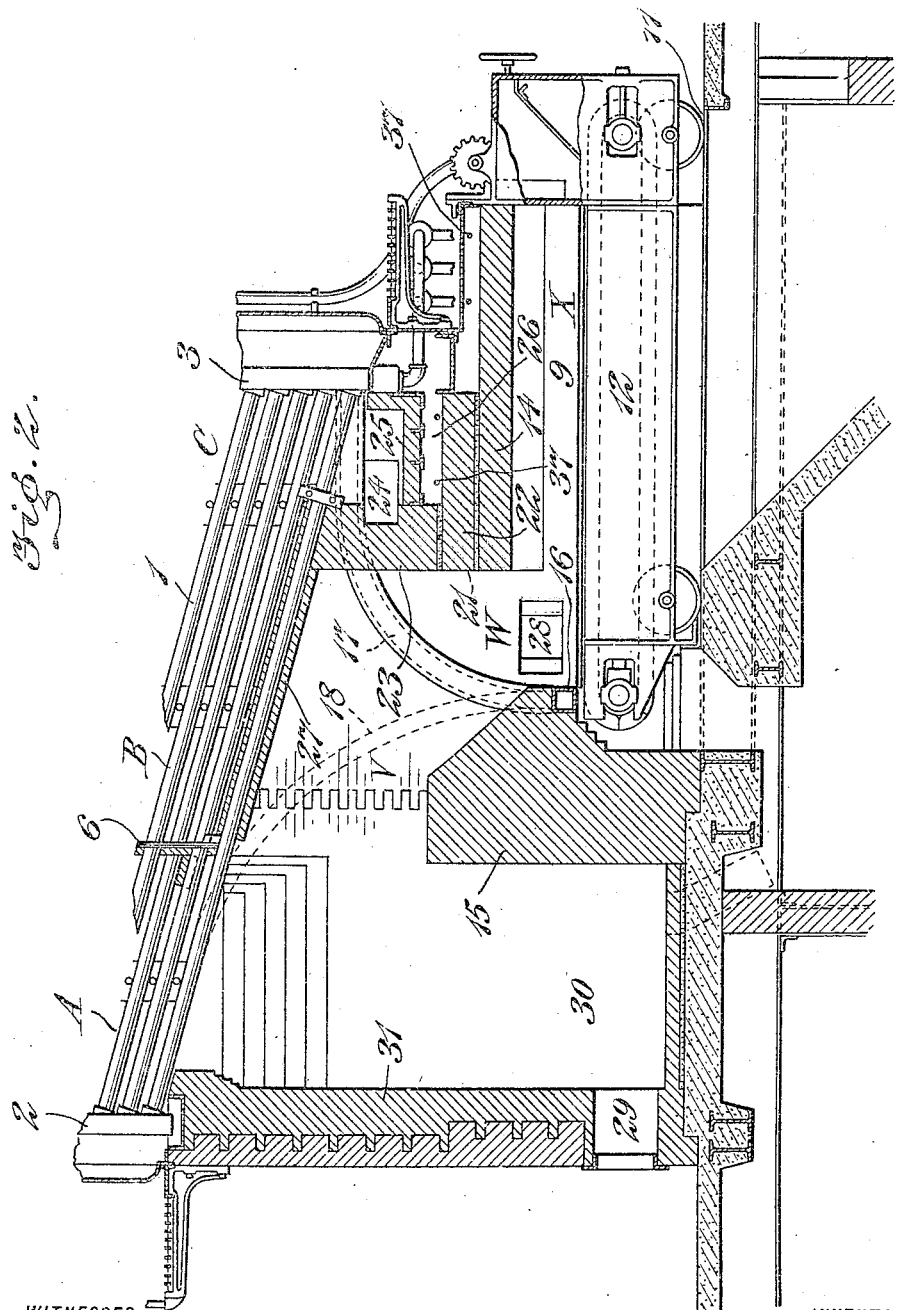

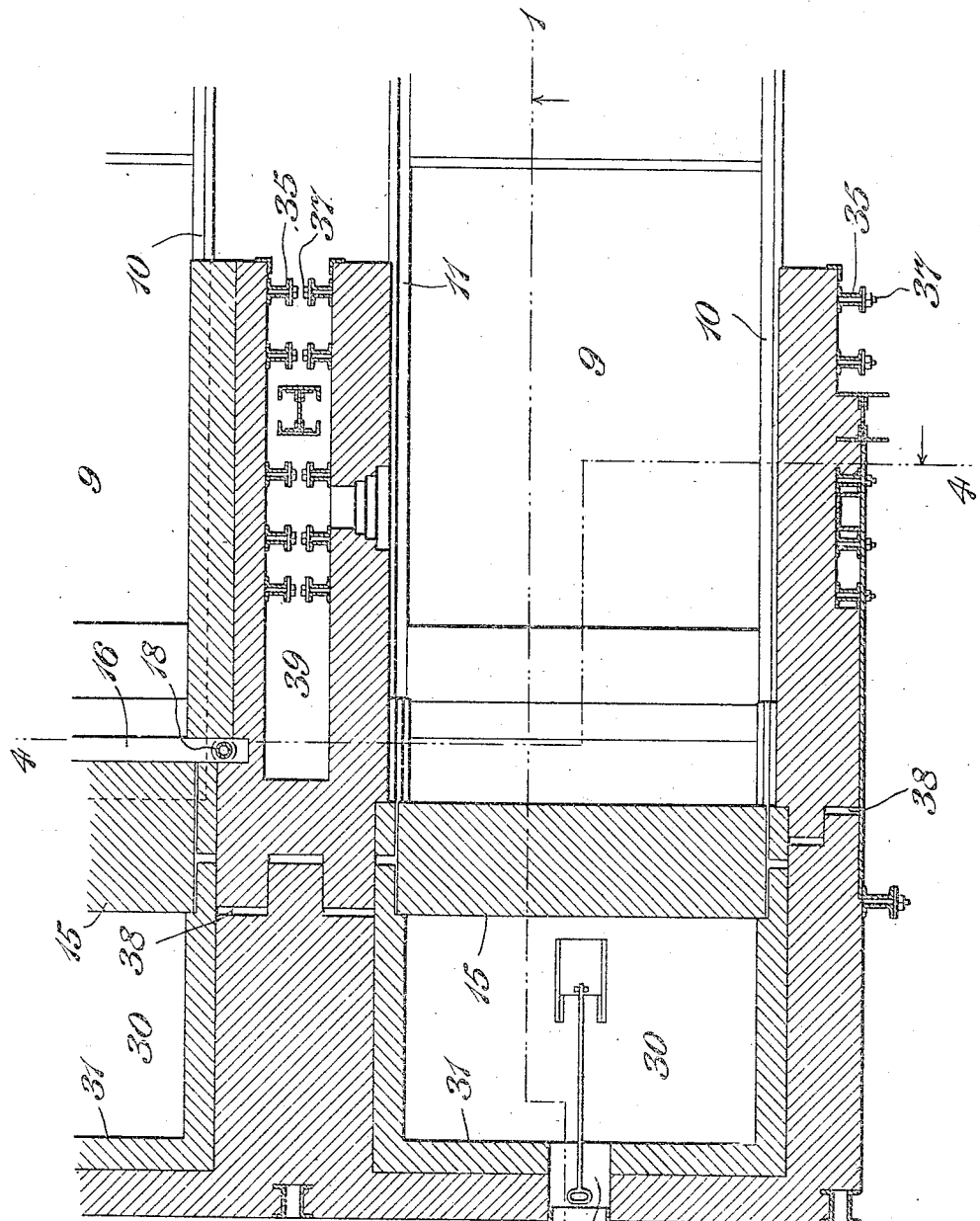

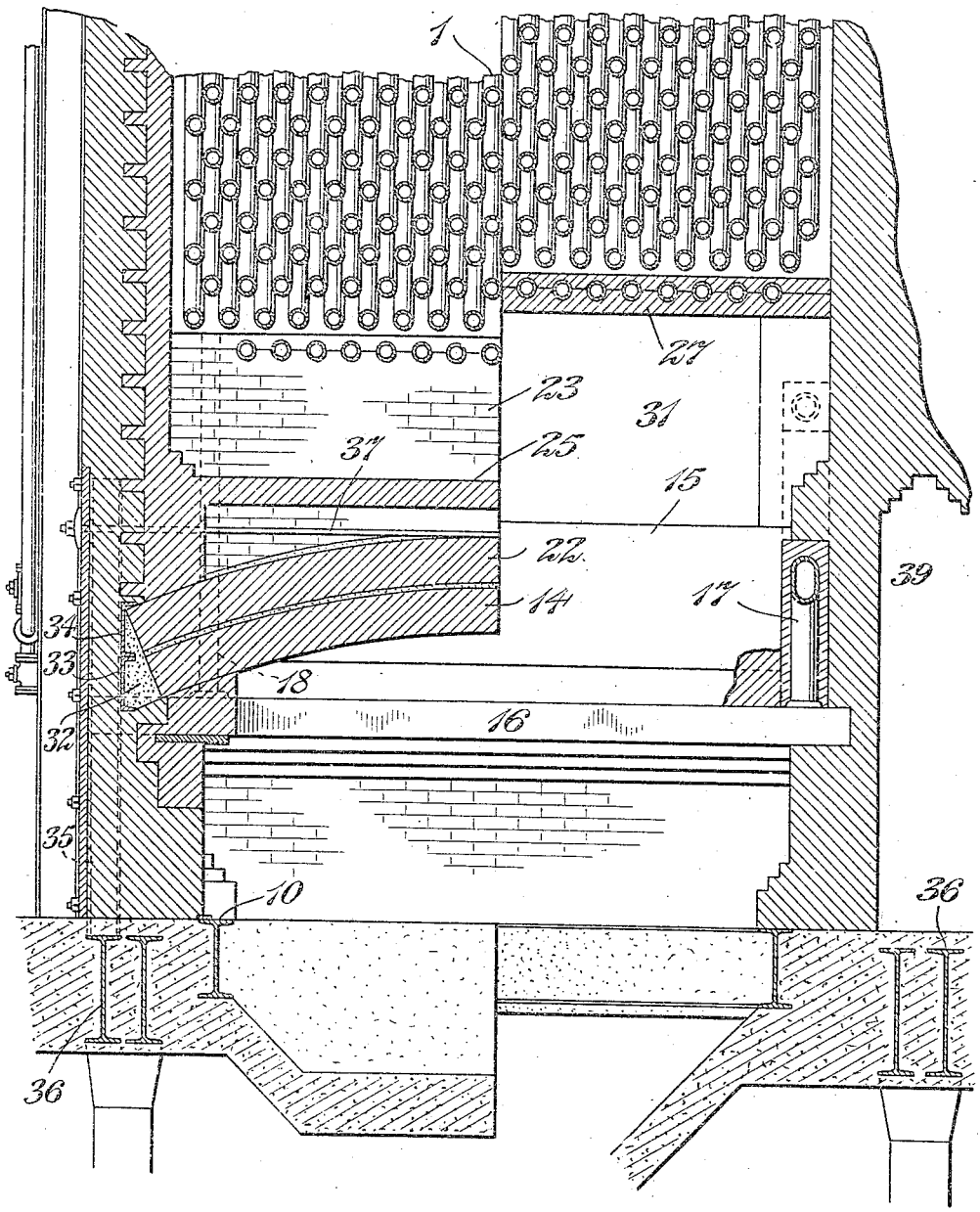

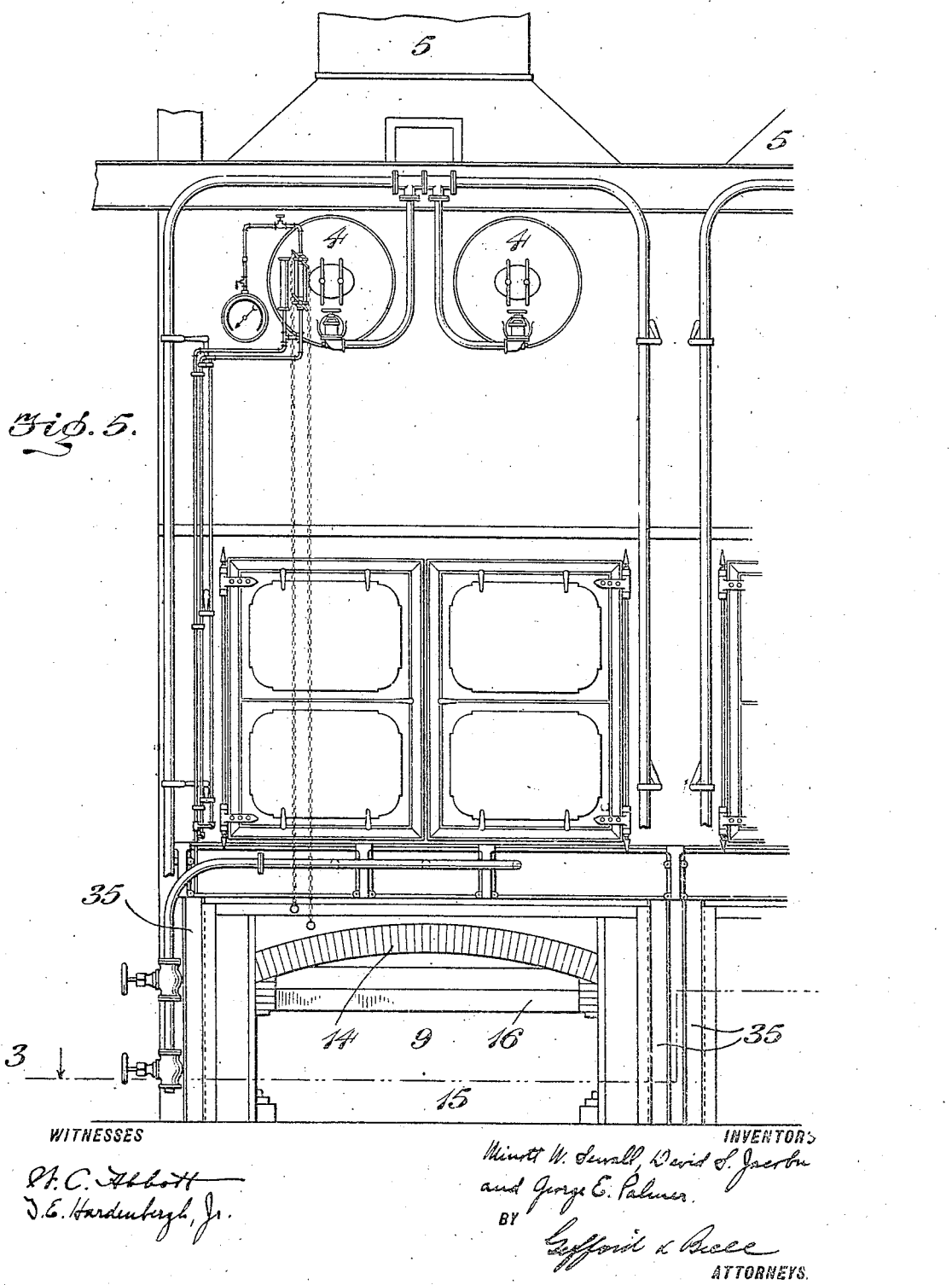

UNITED STATES PATENT OFFICE.

MINOTT W. SEWALL, OF ROSELLE, AND DAVID S. JACOBUS, OF JERSEY CITY, NEW JERSEY, AND GEORGE E. PALMER, OF CHICAGO, ILLINOIS, ASSIGNORS TO THE BABCOCK & WILCOX COMPANY, OF BAYONNE, NEW JERSEY, A CORPORATION OF NEW JERSEY.

WATER-TUBE BOILER.

1,094,754.

Specification of Letters Patent.

Patented Apr. 28, 1914.

Application filed February 20, 1909. Serial No. 479,218.

*To all whom it may concern:*

Be it known that we, MINOTT W. SEWALL, a citizen of the United States, and a resident of Roselle, Union county, State of New Jersey, DAVID S. JACOBUS, a citizen of the United States, and a resident of Jersey City, Hudson county, State of New Jersey, and GEORGE E. PALMER, a citizen of the United States, and a resident of Chicago, Cook county, State of Illinois, have invented certain new and useful Improvements in Water-Tube Boilers, of which the following is a specification.

A standard form of boiler, inclusive of boiler construction proper (*i. e.* the bank of water-tubes, the headers, the steam and water drum, the mud-drum and their connections) and the setting thereof, is, aside from certain details, shown in Letters Patent of the United States No. 638,716, December 12, 1899, to the Babcock & Wilcox Co., assignee of W. D. Hoxie. In this construction, the setting, inclusive of furnace, baffles and up-take is so arranged that the gases make three transverse passes in the bank of tubes. The first pass is at the upper end of the tubes and forms substantially an upward extension of the furnace; the tubes in this first pass constituting a portion of the roof of the furnace and the gases rising directly from the grate surface to said roof. The water-tubes also extended in said furnace beneath the second and third passes and also extended down the sides of said furnace. When burning highly volatile grades of coal with the construction shown in said Patent No. 638,716, the termination of the flame in the bank of tubes is of a smoky character and it has long been known that it was impracticable to run said construction with bituminous coal above rating without the production of a smoky nuisance.

The object of the present invention is to so re-set the boiler construction proper above referred to as to maintain the efficiency and also the steam generating ability for which it is noted and at the same time to enable it to burn highly volatile bituminous coal without smoking and particularly when combined with a superheater and an automatic stoker, such as a chain grate.

In the accompanying drawings, Figure 1 is a sectional elevation of a boiler containing our invention on the line 1, 1, of Fig. 3. Fig. 2 is a more detailed view of the furnace and adjacent parts. Fig. 3 is a sectional plan on the line 3, 3, of Fig. 5. Fig. 4 is a vertical section on the line 4, 4 of Fig. 3. Fig. 5 is a front view.

1 is the bank of water-tubes here shown as containing 14 rows of 18 tubes each.

2, 3, are the headers that may be sectional or otherwise.

4 is the steam and water-drum that is shown as longitudinal but which may be transverse as shown in said Patent No. 638,716.

5 is the up-take.

6 and 7 are deflectors that divide the bank of tubes into the three transverse passes A, B, C.

8 is a superheater located in the triangular space between the steam drum and the passes A, B, so that the gases have to heat this superheater in going over the deflector 6.

9 is the furnace containing the rails 10, 11, upon which runs the chain grate apparatus of well known construction 12. This chain grate apparatus is shown in position in Fig. 2 and the position of the chain is shown in dotted lines in Fig. 1, but the other figures show the furnace with the chain grate apparatus removed.

14 is a firebrick arch completely spanning the furnace above the grate and continuing for the full length of the grate excepting a length at the rear of the grate sufficient for the throat W leading upward to the passage V extending rearwardly and upwardly to the first pass A in the bank of tubes. The furnace arch 14 projects, as shown, beyond the front face of the boiler.

15 is a bridge wall which preferably overhangs the rear end of the grate, as shown, and contains a square water-box 16 which extends across the furnace and is placed at a proper distance above the grate at about the tangent point of the curve of the grate as it passes over its back sprocket wheel. This box 16 forms a dam against which the fire is carried by the movement of the grate and under which the clinker and ash pass to be discharged from the grate. The wall 15 covers the top of the box 16 to prevent too rapid development of steam from that part of the box with possible steam pocketing which might result in overheating and buckling. The box 16 is supplied with circulating water by a bent tube 17 which is expanded at one end into a lower tube hole of the down-take header. The other end is expanded into the top of the water-box 16. An outlet tube shown in dotted lines at 18, Fig. 2, is taken from the top of the water-box 16 at its opposite end and leads to a lower tube hole in the up-take header.

Above the box 16, we prefer to continue the overhang of the wall 15, as shown in Fig. 1 at 19. Thereby, the heat upon the surfaces 20 and 21 bounding the passage W is so intense that any non-combustible material depositing upon those surfaces which would otherwise form clinker is melted and drips down onto the fire and is carried by the grate into the ash-pit. Above the arch 14 is a secondary arch 22 adapted to stand in case the lower arch 14 should fall. This is particularly important in case the inner end of the lower arch should fall at a time when the boiler cannot well be put out of commission. The cross wall 23 above the secondary arch connects it with the baffle 27 and forms a chamber into which soot may fall and collect and be removed through a door 24 in the brick setting. A floor 25 is constructed within this soot chamber from T-bars and firebrick to form a ventilating space, keeping cool the cross rods extending therethrough for the proper maintenance of the skew back of the arches. The baffle 27 is of firebrick and constitutes a roof embracing the lower row of the bank of water-tubes and extending from the cross wall 23 to the foot of the baffle 6. This is built of firebrick of special shape supported by the boiler tubes and forming a roof or diaphragm between the passage V and the second pass B in the bank of water-tubes.

A door 28 for observation and for access to the fire is placed in the side wall of the furnace at the mouth of the throat W. 29 is an opening for the cleaning of the space 30 between the firebrick wall 15 and the firebrick wall 31, extending from the up-take header 2 to the floor line.

The firebrick arches 14 and 22 are supported at opposite ends by skew backs, one of which is shown at 32 in Fig. 4. They rest on the lower flanges of L-beams 33, 34, placed directly in contact with double L-beam buck stays 35, as shown in dotted lines in Fig. 4. The skew backs 32 are sufficiently removed from the fire so that they are not detrimentally affected by the heat of the furnace; 18 inches of firebrick work intervening between the nearest point of the skew back and the inside of the furnace side wall. At the bottom, the buck-stays rest on beams 36 and each pair of buck-stays is secured together at the top by a tie-rod 37 extending across above the arch. Those tie-rods over the inner and therefore hotter part of the furnace are protected from the heat of the furnace by passing through the ventilated space 26 already referred to. On account of the considerable length of the furnace, a continuous side wall of firebrick would, from expansion, be likely to crack the exterior walls. There are, therefore, introduced expansion joints 38 to permit each section to expand independently.

There is a pocket 39 between the adjacent walls of a battery of furnaces and independent sets of buck-stays are used for the individual furnaces of the battery. Therefore, each furnace is self-sustaining and may be repaired independently of the other furnaces of the battery.

By the construction shown and above described, an exceedingly strong and readily repaired furnace is made and the parts entering into this construction which would be injured by heat are well protected against such injury and the inner portion of the arch 14, which being subjected to the highest temperature is the first to chip off and crumble away, is supplemented by the overlying arch 22. The secondary arch may be extended completely over the main arch to serve in case the whole main arch should fail.

A trough consisting of a channel beam 39' with the ends closed is placed under each header to catch any wash water that may overflow when cleaning the boilers and to convey it away rather than allow it to fall on the fire-brick work below and injure the arches or walls.

Instead of being formed within a furnace having overlying and flanking steam generating water-tubes intended for the extraction of heat and thence proceeding directly upward into the first transverse pass of the bank of tubes as in said Hoxie Patent No. 638,716, the volatile gases in our construction are generated in firebrick wall surroundings and before reaching the first transverse pass are compelled to traverse the passages W and V still substantially surrounded by firebrick walls. Thus, where volatile bituminous coal is employed, the flame of the gases should terminate in the passage V before reaching the first transverse pass A in the bank of tubes and will be surrounded by such non-cooling conditions that it will terminate in a clear flame as distinguished from a smoky flame and thus avoid the smoke nuisance. At the same time their temperature upon entering the transverse pass A will be such as to maintain that degree of evaporation and that efficiency for which the said boiler construction is noted.

The principle of operation of our furnace may be applied to other kinds of water-tube boilers than that shown and, therefore, unless the limitation is expressed in the claims, we do not wish to be understood as limited to said kind of water-tube boiler. This principle of furnace operation is embodied in the combination of three distinct parts, namely: (1) The fuel chamber X wherein the coal is gasified and the fixed carbon burned out in the presence of the highly heated reflecting surface of the arch 14. (2) The mixing chamber W wherein the volatilized gases are thoroughly mixed with air in coming through or at the rear of the grate and wherein the mixture is under the direct influence of the radiant heat radiating at right angles through said chamber W from the live coals of the rear portion of the fire. (3) The final combustion chamber V wherein the combustion is completed and the flame ends substantially before it reaches any tubes for the generation of steam. The available or total heat of the gases increases as the combustion of the volatilized gases continues in the passages W V; not being decreased by any substantial contact of those gases with tubes for the generation of steam in those passages; and being, in the passage W, directly in the full force of the heat radiating from the portion of the grate below the same. This increase in the available or total heat of the gases cannot be determined by a pyrometer because of the effect of the radiant heat on the same in the fuel chamber X and passage W.

The gases volatilized in the fuel chamber X under arch 14, turn, first into the chamber W, thence turn into the chamber V, and thence turn to the first pass A among the water tubes. These turns in the course of the gases are important because each turn tends to mix the gases and produce more or less of a rest in their flow so as to shorten the flame and insure their proper smokeless combustion before reaching the water tubes.

Having thus described our invention, we claim as new—

1. In a water tube boiler, in combination, a furnace having side walls, an arched roof spanning the furnace above the grate, a cross wall above the arch, a roof extending from said cross wall and forming with the cross wall a chamber into which soot may fall, a floor for said chamber above the arch and forming with the arch a space excluded from the furnace, buck stays forming abutments for the opposite ends of the arch, and tie rods connecting the buck stays through said space.

2. In a water tube boiler, in combination, a furnace comprising side walls and an arched roof spanning the furnace above the grate, buck stays forming an abutment for said arch, tie rods connecting the buck stays on opposite sides and extending between said arch and the bank of tubes, and a floor 25 interposed between the bank of tubes and the tie rods and providing an air space exterior to the furnace for said tie rods above the arch.

In testimony whereof we have signed our names to this specification in the presence of two subscribing witnesses.

MINOTT W. SEWALL.
DAVID S. JACOBUS.
GEORGE E. PALMER.

Witnesses to Sewall and Jacobus:
EDITH CAMP,
ROBERT S. DALENZ.

Witnesses to Palmer:
HILDUR ANDERSON,
CHARLES F. DRAKE.